(12) United States Patent
Wei

(10) Patent No.: US 10,330,883 B2
(45) Date of Patent: Jun. 25, 2019

(54) CAMERA DEVICE AND TERMINAL HAVING SAME

(71) Applicant: Guangdong Oppo Mobile Telecommunications Corp., Ltd., Dongguan (CN)

(72) Inventor: Yi Wei, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/839,878

(22) Filed: Dec. 13, 2017

(65) Prior Publication Data

US 2018/0113270 A1    Apr. 26, 2018

Related U.S. Application Data

(63) Continuation of application No. 15/547,567, filed as application No. PCT/CN2016/082322 on May 17, 2016.

(30) Foreign Application Priority Data

Jun. 30, 2015   (CN) .......................... 2015 1 0381176

(51) Int. Cl.
  *G02B 7/02*    (2006.01)
  *G03B 37/02*   (2006.01)
  (Continued)

(52) U.S. Cl.
  CPC .............. *G02B 7/02* (2013.01); *G03B 37/02* (2013.01); *H04N 5/225* (2013.01);
  (Continued)

(58) Field of Classification Search
  CPC ............. H04N 5/2254; H04N 5/23238; H04N 5/23248; H04N 5/2257; H04N 5/23287;
  (Continued)

(56) References Cited

U.S. PATENT DOCUMENTS 9,516,231 B2    12/2016 Jeong
2009/0161240 A1  6/2009 Chang
(Continued)

FOREIGN PATENT DOCUMENTS

CN    101470237    7/2009
CN    102118552    7/2011
(Continued)

OTHER PUBLICATIONS

Notification of Office Action and Search Report dated Jun. 20, 2016 From the State Intellectual Property Office of the People's Republic of China Re. Application No. 201510381176.0 and Its Translation Into English. (14 Pages).
(Continued)

*Primary Examiner* — Evan P Dzierzynski
*Assistant Examiner* — Alberto J Betancourt
(74) *Attorney, Agent, or Firm* — Ladas & Parry LLP

(57) ABSTRACT

A camera device is proposed. The camera device includes a mounting member for mounting a camera lens, and a supporting member. The mounting member is pivotably connected to the supporting member, and a rotation axis of the mounting member is perpendicular to an axial direction of the camera lens. The mounting member has a magnet disposed thereon, the magnet is located at a side of the rotation axis of the mounting member, and an orientation of magnetic poles of the magnet is parallel to the axial direction of the camera lens. The supporting member has an electromagnet disposed thereon, and an axis of the electromagnet is perpendicular to the rotation axis of the mounting member. The magnet is located at one end of the axis of the electromagnet.

18 Claims, 1 Drawing Sheet

(51) Int. Cl.
*H04N 5/225* (2006.01)
*H04N 5/232* (2006.01)

(52) U.S. Cl.
CPC ......... *H04N 5/2254* (2013.01); *H04N 5/2259* (2013.01); *H04N 5/232* (2013.01); *G03B 2205/0069* (2013.01); *H04N 5/23238* (2013.01); *H04N 5/23248* (2013.01)

(58) Field of Classification Search
CPC .. H04N 5/2259; H04N 5/225; H04N 5/23274; H04N 5/23299; H04N 5/2328; G02B 7/02; G02B 27/646; G03B 2205/0069; G03B 37/00; G03B 37/02; G03B 2205/0023
USPC ..... 359/824, 557, 694, 814; 348/345, 208.7, 348/335, 211.11, 262, 374, E5.028, 348/E5.042, 208.11, 208.4, 373; 396/55, 396/133, 79, 20
See application file for complete search history.

(56) References Cited

U.S. PATENT DOCUMENTS

| | | |
|---|---|---|
| 2010/0182492 A1 | 7/2010 | Choi |
| 2010/0182696 A1* | 7/2010 | Hasegawa ............ G02B 27/646 359/557 |
| 2011/0044679 A1* | 2/2011 | Yoshida ............... H04N 5/2254 359/824 |
| 2011/0149421 A1* | 6/2011 | Park ....................... G02B 7/023 359/824 |
| 2011/0158625 A1* | 6/2011 | Chiang ................. H04N 5/2254 396/133 |
| 2013/0033584 A1 | 2/2013 | Seo et al. |
| 2014/0192212 A1 | 7/2014 | He et al. |
| 2014/0285678 A1 | 9/2014 | Jeong |
| 2015/0085167 A1 | 3/2015 | He et al. |

FOREIGN PATENT DOCUMENTS

| | | |
|---|---|---|
| CN | 102624978 | 8/2012 |
| CN | 202696756 | 1/2013 |
| CN | 103002086 | 3/2013 |
| CN | 103916582 | 7/2014 |
| CN | 104301609 | 1/2015 |
| CN | 104994261 | 10/2015 |
| JP | 2004320206 A | 11/2004 |
| JP | 2005026284 A | 1/2005 |
| JP | 2005210417 A | 8/2005 |
| JP | 2005284212 A | 10/2005 |
| JP | 2005311758 A | 11/2005 |
| JP | 2006-047342 | 2/2006 |
| JP | 2011-027947 | 2/2011 |
| JP | 2013034124 A | 2/2013 |
| JP | 2015001620 A | 1/2015 |
| WO | WO 2013/065980 | 5/2013 |
| WO | WO 2017/000689 | 1/2017 |

OTHER PUBLICATIONS

Notification of Office Action and Search Report dated Dec. 27, 2016 From the State Intellectual Property Office of the People's Republic of China Re. Application No. 201510381176.0 and Its Translation Into English. (11 Pages).

Notification of Office Action dated Sep. 23, 2016 From the State Intellectual Property Office of the People's Republic of China Re. Application No. 201510381176.0 and Its Translation Into English. (11 Pages).

Notification to Grant Patent Right and Search Report dated Apr. 7, 2017 From the State Intellectual Property Office of the People's Republic of China Re. Application No. 201510381176.0 and Its Translation Into English. (10 Pages).

* cited by examiner

CAMERA DEVICE AND TERMINAL HAVING SAME

RELATED APPLICATIONS

This application is a Continuation of U.S. patent application Ser. No. 15/547,567, filed on Jul. 31, 2017, which is a National Phase of PCT Patent Application No. PCT/CN2016/082322 having International filed date of May 17, 2016, which claims the benefit of priority of Chinese Patent Application No. 201510381176.0, filed Jun. 30, 2015. The contents of the above applications are all incorporated by reference as if fully set forth herein in their entirety.

FIELD AND BACKGROUND OF THE INVENTION

The present disclosure relates to photographing techniques, and more particularly, to a camera device and a terminal having the camera device.

Currently, camera lenses on terminal devices are usually adopted from existing camera lenses in the market. Because of the limited view angle of these cameras, wide-angle photographing is impossible to be carried out. The wide-angle photographing is often required in using the terminal, so as to contain much content in a picture. Generally speaking, currently, the camera lenses are directly mounted on the terminals. View angles have already been determined by fastening members of the camera lenses. It is difficult to carry out the wide-angle photography. Therefore, a device capable of enlarging the view angle of the existing camera lenses is necessary.

SUMMARY OF THE INVENTION

In order to solve the technical problems, the present disclosure proposes a camera device and a terminal for enlarging a view angle of a camera lens.

In an aspect of the present disclosure, an embodiment of the present disclosure provides a camera device, which includes a mounting member for mounting a camera lens, a supporting member, and a protective barrel.

The mounting member is pivotably connected to the supporting member, and a rotation axis of the mounting member is perpendicular to an axial direction of the camera lens. The mounting member has a magnet disposed thereon, the magnet is located at a side of the rotation axis of the mounting member, and an orientation of magnetic poles of the magnet is parallel to the axial direction of the camera lens.

The supporting member has an electromagnet disposed thereon, and an axis of the electromagnet is perpendicular to the rotation axis of the mounting member. The magnet is located at one end of the axis of the electromagnet.

The protective barrel is fastened and connected to the supporting member, the mounting member is disposed inside the protective barrel, and the protective barrel and the mounting member have a rotational structure disposed therebetween.

In the camera device of the present disclosure, the number of the electromagnets is two, and the two electromagnets are respectively disposed at two sides of the rotation axis of the mounting member. Both of the electromagnets are electrically connected to a controller. The number of the magnets is two, and the two magnets are respectively disposed corresponding to the two electromagnets.

When one electromagnet and a magnet corresponding thereto attract each other, the other electromagnet and a magnet corresponding thereto repel each other.

In the camera device of the present disclosure, the mounting member is shaped as a barrel, and the mounting member has a mounting chamber formed therein for mounting the camera lens. The mounting member has a protruding portion disposed on an exterior wall thereof and the magnet is disposed on the protruding portion.

In the camera device of the present disclosure, the supporting member is of a ring shape and is put upon the mounting member.

In the camera device of the present disclosure, the supporting member has a positioning structure disposed thereon for fixing relative positions of the supporting member and the mounting member.

In the camera device of the present disclosure, the positioning structure is an elastic sheet, and the elastic sheet is disposed away from the rotation axis of the mounting member as compared to the electromagnet. One end of the elastic sheet is fastened to the supporting member and the other end has a bump disposed thereon. The mounting member has a slot disposed thereon and the bump is abutted on the slot.

In the camera device of the present disclosure, the mounting member has an elastic metal piece disposed thereon for connecting to the camera lens; the mounting member also has a flexible circuit board disposed thereon, and one end of the flexible circuit board is electrically connected to the elastic metal piece.

In the camera device of the present disclosure, the flexible circuit board is connected at a central position of a closed end of the mounting member.

In the camera device of the present disclosure, the supporting member has an electrical connector for connecting to a system board of a terminal, and both of the flexible circuit board and the electromagnet are electrically connected to the electrical connector.

An embodiment of the present disclosure further provides a camera device, which includes a mounting member for mounting a camera lens, and a supporting member.

The mounting member is pivotably connected to the supporting member, and a rotation axis of the mounting member is perpendicular to an axial direction of the camera lens. The mounting member has a magnet disposed thereon, the magnet is located at a side of the rotation axis of the mounting member, and an orientation of magnetic poles of the magnet is parallel to the axial direction of the camera lens.

The supporting member has an electromagnet disposed thereon, and an axis of the electromagnet is perpendicular to the rotation axis of the mounting member. The magnet is located at one end of the axis of the electromagnet.

In the camera device of the present disclosure, the number of the electromagnets is two, and the two electromagnets are respectively disposed at two sides of the rotation axis of the mounting member. Both of the electromagnets are electrically connected to a controller. The number of the magnets is two, and the two magnets are respectively disposed corresponding to the two electromagnets.

When one electromagnet and a magnet corresponding thereto attract each other, the other electromagnet and a magnet corresponding thereto repel each other.

In the camera device of the present disclosure, the mounting member is shaped as a barrel, and the mounting member has a mounting chamber formed therein for mounting the camera lens. The mounting member has a protruding portion disposed on an exterior wall thereof and the magnet is disposed on the protruding portion.

In the camera device of the present disclosure, the supporting member is of a ring shape and is put upon the mounting member.

In the camera device of the present disclosure, the supporting member has a positioning structure disposed thereon for fixing relative positions of the supporting member and the mounting member.

In the camera device of the present disclosure, the positioning structure is an elastic sheet, and the elastic sheet is disposed away from the rotation axis of the mounting member as compared to the electromagnet. One end of the elastic sheet is fastened to the supporting member and the other end has a bump disposed thereon. The mounting member has a slot disposed thereon and the bump is abutted on the slot.

In the camera device of the present disclosure, the mounting member has an elastic metal piece disposed thereon for connecting to the camera lens; the mounting member also has a flexible circuit board disposed thereon, and one end of the flexible circuit board is electrically connected to the elastic metal piece.

In the camera device of the present disclosure, the flexible circuit board is connected at a central position of a closed end of the mounting member.

In the camera device of the present disclosure, the supporting member has an electrical connector for connecting to a system board of a terminal, and both of the flexible circuit board and the electromagnet are electrically connected to the electrical connector.

In another aspect, the present disclosure further provides a terminal, which includes a camera lens and the aforesaid camera device. The camera lens is fastened to and mounted on the mounting member of the camera device.

In the terminal of the present disclosure, the terminal further includes a system board, and the system board is electrically connected to the electromagnet for controlling an orientation of magnetic poles of the electromagnet such that the electromagnet and the magnet attract or repel each other, and thus the mounting member is driven to rotate.

In the camera device and the terminal provided in the present disclosure, a change of the coil current applied to the electromagnet can alter the magnetic poles of the electromagnet such that attraction and repulsion can be transformed one from the other between the electromagnet and the magnet. Since the mounting member is pivotably connected to the supporting member, rotation of the mounting member can be carried out by use of interaction between the electromagnet and the magnet. The mounting member can drive rotation of the camera lens such that the camera lens can capture images of various view angles, the view angle of the camera lens is enlarged, and the effect of wide angle is carried out.

DESCRIPTION OF SPECIFIC EMBODIMENTS OF THE INVENTION

A clear and complete description of technical schemes of embodiments of the present disclosure is provided below with reference to the accompanying drawings.

Figure 1:
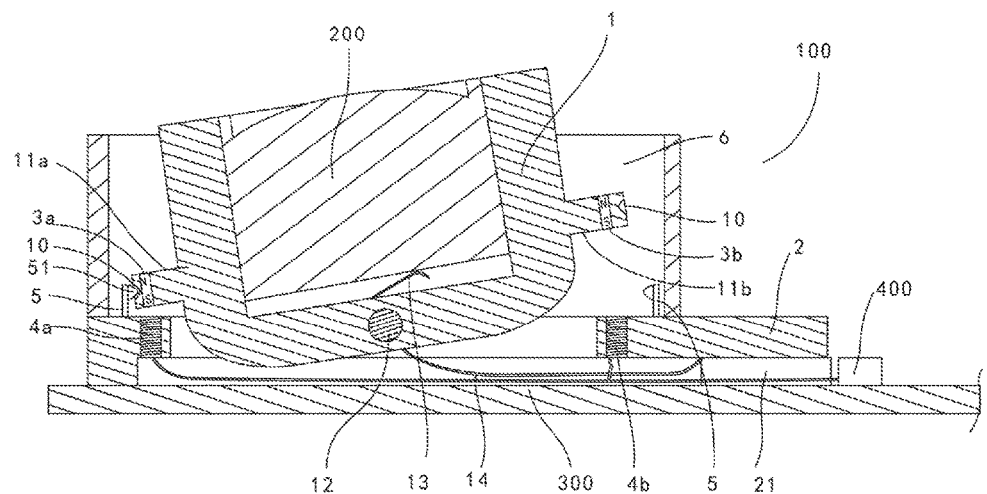
FIG. 1 is a sectional view of a camera device provided in a preferred embodiment of the present disclosure.
Figure 2:
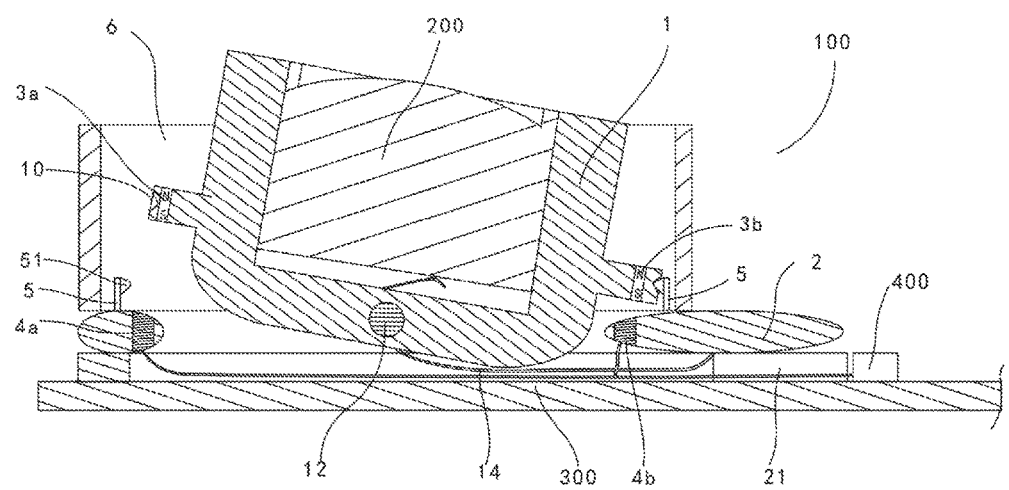
FIG. 2 is a schematic diagram showing that a camera lens of the camera device shown in FIG. 1 is rotated at another angle.

FIG. 1 and FIG. 2 show a terminal provided in a preferred embodiment of the present disclosure. The terminal can be implemented by a cell phone, a personal digital assistant (PDA), or a tablet computer. The terminal includes a camera lens 200, a camera device 100, and a system board 300. The camera lens 200 is mounted on the camera device 100 and can be electrically connected to the system board 300 of the terminal via the camera device 100. The camera device 100 includes a mounting member 1 for mounting the camera lens 200, and a supporting member 2.

The mounting member 1 is pivotably connected to the supporting member 2. An axis of rotation of the mounting member 1 is perpendicular to an axial direction of the camera lens 200. The mounting member 1 has magnets 3a, 3b disposed thereon. The magnet is located at a side of the rotation axis of the mounting member 1. The orientation of magnetic poles of the magnets 3a, 3b is parallel to the axial direction of the camera lens 200. The supporting member 2 has electromagnets 4a, 4b disposed thereon. The axis of the electromagnets 4a, 4b is perpendicular to the rotation axis of the mounting member 1. The magnets 3a, 3b are located at one end of the axis of the electromagnets 4a, 4b. Magnetic poles of the electromagnets 4a, 4b can be altered as the direction of a coil current of the electromagnets 4a, 4b is changed. In such a manner, attraction and repulsion can be transformed one from the other between the electromagnets and the magnets. Since the mounting member 1 is pivotably connected to the supporting member 2, rotation of the mounting member 1 can be carried out by use of interaction between the electromagnets and the magnets. The mounting member 1 can drive rotation of the camera lens 200 such that the camera lens 200 can capture images of various view angles, the view angle of the camera lens 200 is enlarged, and the effect of wide angle is carried out. By a synthesis of the images carried out from multiple directions, a picture of a large view angle is thus obtained. Therefore, the effect of wide angle can be carried out by using an existing camera lens of an ordinary view angle in the market in cooperation with the camera device 100 of the present disclosure.

Further, the number of the electromagnets is two, that is, 4a and 4b. The two electromagnets 4a, 4b are respectively disposed at two sides of the rotation axis of the mounting member 1. Both of the electromagnets 4a, 4b are electrically connected to a controller. Correspondingly, the number of the magnets is two, that is, 3a and 3b. The two magnets 3a, 3b are respectively disposed corresponding to the two electromagnets 4a, 4b. When one electromagnet 4a and the corresponding magnet 3a attract each other, the other electromagnet 4b and the corresponding magnet 3b repel each other. By cooperation between the two electromagnets 4a, 4b and the two magnets 3a, 3b, the forces are provided at two positions with respect to the rotation axis of the mounting member 1. This increases the magnitude of the forces and is beneficial to the rotation of the mounting member 1, making the tilt angle of the mounting member 1 able to be rapidly changed. In other embodiments, the rotation of the mounting member 1 can also be carried out by cooperation of a single electromagnet 4a and a single magnet 3a.

The mounting member 1 is shaped as a barrel. The mounting member 1 has a mounting chamber formed therein for mounting the camera lens 200. The mounting member 1 has protruding portions 11a, 11b disposed on an exterior wall thereof. The magnets 3a, 3b are disposed on the protruding portions 11a, 11b. Deploying the magnets 3a, 3b on the exterior peripheral surface of the mounting member 1 can reduce the dimension of the mounting member 1 along the axial direction of the camera lens 200 and this is beneficial to miniaturization of the camera device 100. It is also beneficial to reduction of the terminal thickness since the axial dimension of the camera lens 200 is not increased after mounted on the terminal. The number of the protruding portions is two, that is, 1a and 1b. The two protruding portions 1a, 1b are symmetrically disposed with respect to the axis of the camera lens 200 in order to facilitate the attachment and installation of the magnets 3a, 3b. Further, the protruding portions 11a, 11b respectively have mounting slots (not shown) disposed thereon. The magnets 3a, 3b are embedded into the mounting slots of the protruding portions 11a, 11b so as to facilitate the connection between the magnets 3a, 3b and the protruding portions 11a, 11b. Meanwhile, this makes the magnets 3a, 3b securely fastened and not easy to fall off. In other embodiments, the mounting member 1 can also be shaped as a plate. The camera lens 200 can be directly fastened to one planar surface of the mounting member 1 via a fastening member. The magnets 3a, 3b can be fastened to the other planar surface of the mounting member 1.

Further, the supporting member 2 is of a ring shape and is put upon the mounting member 1. This can further reduce the dimension of the entire camera device 100 along the axial direction of the camera lens 200. Meanwhile, a rotation mechanism of the mounting member 1 is carried out by use of the supporting member 2. In the present embodiment, the mounting member 1 has a rotation shaft 12 fastened thereon. The supporting member 2 has a rotation hole (not shown) disposed at an inner wall thereof. The rotation shaft 12 is pivotably connected to the rotation hole. In such a manner, the mounting member 1 is pivotably connected to the supporting member 2. In another embodiment, it can also be that the rotation shaft is fastened to the supporting member 2 and the mounting member 1 is perforated to form the rotation hole. Alternatively, in another further embodiment, the number of the rotation shafts 12 is two and the two rotation shafts are individually fastened to the supporting member 2. The number of the rotation holes on the mounting member 1 is two and the two rotation holes are arranged along a direction perpendicular to the axial direction of the camera lens 200. The two rotation shafts 12 are pivotably disposed in the two rotation holes, respectively. In such a manner, the mounting member 1 is pivotably connected to the supporting member 2.

The supporting member 2 has a positioning structure disposed thereon for fixing relative positions of the supporting member 2 and the mounting member 1. In the present embodiment, the positioning structure is preferred to be an elastic sheet 5. By using the positioning structure, the relative positions of the supporting member 2 and the mounting member 1 can be fixed after magnetic interaction between the electromagnets 4a, 4b and the magnets 3a, 3b is completed. This can prevent the mounting member 1 from rotating relative to the supporting member 2 after the electricity supplied to the electromagnets 4a, 4b is cut off, and prevent the camera lens 200 from shanking itself and being worn out. In the present embodiment, the number of the positioning structures is two. The two positioning structures are disposed respectively at two sides of the rotation axis of the mounting member 1. They can locate the mounting member 1 at two positions. When the mounting member 1 is located at a first position, one electromagnet 4a, 4b and the corresponding magnet 3a, 3b attract each other, and the other electromagnet 4a, 4b and the corresponding magnet 3a, 3b repel each other. When the mounting member 1 is located at a second position, one electromagnet 4a, 4b and the corresponding magnet 3a, 3b repel each other, and the other electromagnet 4a, 4b and the corresponding magnet 3a, 3b attract each other.

Preferably, the positioning structure is an elastic sheet 5. As compared to the electromagnets 4a, 4b, the elastic sheet 5 is disposed away from the rotation axis of the mounting member 1. One end of the elastic sheet 5 is fastened to the supporting member 2 and the other end has a bump 51 disposed thereon. The mounting member 1 has a slot 10 disposed thereon. The bump 51 is abutted on the slot 10. The elastic force provided by the elastic sheet 5 can make the bump 51 tightly abutted on the slot 10. When a rotational force is experienced from the mounting member 1, it is convenient for the bump 51 to get into or get out of the slot 10. The elastic sheet 5 is simple in structure and is easy to be processed and prepared. One end of the elastic sheet 5 can be directly embedded into the supporting member 2 such that it is convenient to assemble and connect the elastic sheet 5 and the supporting member 2. The other end of the elastic sheet 5 can be punched to form the bump 51 so as to facilitate formation of the bump 51. Further, the surface of the bump 51 is of an arc shape and the wall of the slot 10 forms a concave arc shape such that it is convenient for the bump 51 to get into or get out of the slot 10. In other embodiments, the elastic sheet 5 can be fastened and connected to the mounting member 1 and a corresponding slot 10 is disposed on the supporting member 2. In another embodiment, the mounting member 1 has a positioning slot 10 disposed thereon. The positioning structure includes a compressed spring and a positioning block. The axis of the compressed spring is perpendicular to the rotation axis of the mounting member 1. The two ends of the compressed spring are respectively abutted on the supporting member 2 and the positioning block. Positioning is carried out by cooperation of the positioning block and the positioning slot 10. The elastic force provided by the compressed spring can make the positioning block get into or get out of the positioning slot 10.

The mounting member 1 has an elastic metal piece 13 disposed thereon for connecting to the camera lens 200. The mounting member 1 also has a flexible circuit board 14 disposed thereon. One end of the flexible circuit board 14 is electrically connected to the elastic metal piece 13. The elastic metal piece 13 is used to abut on a metal joint of the camera lens 200 so as to carry out electric connection with the camera lens 200. Once the camera lens 200 is mounted on the mounting member 1, the camera lens 200 is fixed and electrically connected. By use of flexibility of the flexible circuit board 14, the flexible circuit board 14 may be rotated along with the mounting member 1 but the electrical connection is not affected.

One end of the mounting member 1 facing the supporting member 2 is closed and the other end is opened so as to facilitate mounting the camera lens 20 on the mounting member 1 and fastening thereto. Both of the elastic metal piece 13 and the flexible circuit board 14 are deployed at the closed end of the mounting member 1 so as to facilitate connection with the camera lens 200. Further, the flexible circuit board 14 can be connected at a central position of the closed end of the mounting member 1. The range of rotation is small at this position. The movement of the flexible circuit board is thus reduced. In such a manner, the life cycle of the flexible circuit board 14 is prolonged.

The supporting member 2 has an electrical connector 21 for connecting to the system board 300 of the terminal. Both of the flexible circuit board 14 and the electromagnets 4a, 4b are electrically connected to the electrical connector 21. By use of the electrical connector 21, all of the electrical connection structures on the camera device 100 can be combined at the electrical connector 21. The camera device 100 is connected to the system board 300 as long as the electrical connector 21 is connected to the system board 300. The electrical connector 21 can be plugged on the system board 300, or alternatively, detachably connected to the system board 300 so as to facilitate the installation and maintenance of the camera device 100.

The system board 300 is electrically connected to the electromagnets 4a, 4b for controlling the orientation of magnetic poles of the electromagnets 4a, 4b such that the electromagnets 4a, 4b and the magnets 3a, 3b attract or repel each other, and thus the mounting member 1 is driven to rotate. By use of the system board 300, a control on rotation of the mounting member 1 and the camera lens 200 can be carried out. In such a manner, images are obtained at two positions, and the images are synthesized by using the system board 300. A picture of a large view angle is eventually formed and the effect of wide angle is carried out.

The camera device 100 can further include a protective barrel 6. The protective barrel 6 is fastened and connected to the supporting member 2. The mounting member 1 is disposed inside the protective barrel. The protective barrel 6 is used to protect the mounting member 1 in order to prevent its rotation from interfering with other elements. Meanwhile, the protective barrel 6 and the mounting member 1 can have a rotational structure disposed therebetween so as to make the two elements pivotably connected to each other. Since the protective barrel 6 and the supporting member 2 are fastened and connected to each other, a pivotable connection between the mounting member 1 and the supporting member 2 can be carried out by using the protective barrel 6 without having to dispose a rotational structure between the supporting member 2 and the mounting member 1.

In the camera device 100 provided in the present disclosure, an existing camera lens 200 in the market can be mounted on the terminal device. The camera lens 200 is mounted on the mounting member 1. When a photo is being taken, the system board 300 can be used to control the electromagnets 4a, 4b to generate a magnetic field, and the mounting member and the camera lens 200 are driven to rotate by use of attraction and repulsion between the electromagnets 4a, 4b and the magnets 3a, 3b. In such a manner, the camera lens 200 can obtain images of various view angles so as to carry out the effect of wide angle. The obtained images of various view angles can be synthesized to carry out a wide-angle picture by post processing with use of software in the terminal. The camera device 100 is simple in structure and is easy to be fabricated without occupying much inner space of the terminal.

In above embodiments, when one electromagnet 4a and a corresponding magnet 3a attract each other, the other electromagnet 4b and a corresponding magnet 3b repel each other. The mounting member 1 and the camera lens 200 are positioned by use of a positioning structure, and at this position, the axis of the camera lens 200 makes an acute angle with the external surface of the device. It can also have another positioning structure disposed for positioning the camera lens 200 so as to make its axis perpendicular to the external surface of the device. The angle of rotation of the mounting member 1 can be controlled by setting the current applied to the electromagnets 4a, 4b such that the mounting member 1 is positioned by using the positioning structure when rotated to the aforesaid position. At this position, a picture of an ordinary view angle is obtained in the case that wide-angle photographing is not demanded. This provides more choices for a user.

The foregoing descriptions are not intended to limit the protection scope of the disclosure. Any modifications, identical replacements and improvements made within the spirit and principles of the disclosure shall fall in the protection scope of the disclosure.

What is claimed is:

1. A camera device, comprising: a mounting member for mounting a camera lens, and a supporting member;
   the mounting member pivotably connected to the supporting member, and a rotation axis of the mounting member perpendicular to an axial direction of the camera lens; the mounting member having a magnet disposed thereon, the magnet located at a side of the rotation axis of the mounting member, and an orientation of magnetic poles of the magnet parallel to the axial direction of the camera lens;
   the supporting member having an electromagnet disposed thereon, and an axis of the electromagnet perpendicular to the rotation axis of the mounting member and substantially parallel to the orientation of magnetic poles of the magnet; the magnet located at one end of the axis of the electromagnet;
   the mounting member shaped as a barrel, and the mounting member having a mounting chamber formed therein for mounting the camera lens; the mounting member having a protruding portion disposed on an exterior wall thereof and the magnet disposed on the protruding portion;
   wherein the positioning structure is an elastic sheet, and the elastic sheet is disposed away from the rotation axis of the mounting member as compared to the electromagnet; one end of the elastic sheet is fastened to the supporting member and the other end has a bump disposed thereon; the mounting member has a slot disposed thereon and the bump is abutted on the slot.

2. The camera device according to claim 1, wherein a number of the electromagnets is two, and the two electromagnets are respectively disposed at two sides of the rotation axis of the mounting member; both of the electromagnets are electrically connected to a controller; a number of the magnets is two, and the two magnets are respectively disposed corresponding to the two electromagnets;
   when one electromagnet and a magnet corresponding thereto attract each other, the other electromagnet and a magnet corresponding thereto repel each other.

3. The camera device according to claim 1, wherein the supporting member is of a ring shape and the mounting member is mounted on the supporting member.

4. The camera device according to claim 1, wherein the supporting member has a positioning structure disposed thereon for fixing relative positions of the supporting member and the mounting member.

5. The camera device according to claim 1, wherein the mounting member has an elastic metal piece disposed thereon for connecting to the camera lens; the mounting member also has a flexible circuit board disposed thereon, and one end of the flexible circuit board is electrically connected to the elastic metal piece.

6. The camera device according to claim 5, wherein the supporting member has an electrical connector disposed thereon for connecting to a system board of a terminal, and both of the flexible circuit board and the electromagnet are electrically connected to the electrical connector.

7. A terminal, comprising a camera device and a camera lens, the camera lens fastened to and mounted on the mounting member of the camera device, wherein the camera device comprises a mounting member for mounting a camera lens, and a supporting member;

the mounting member pivotably connected to the supporting member, and a rotation axis of the mounting member perpendicular to an axial direction of the camera lens; the mounting member having a magnet disposed thereon, the magnet located at a side of the rotation axis of the mounting member, and an orientation of magnetic poles of the magnet parallel to the axial direction of the camera lens;

the supporting member having an electromagnet disposed thereon, and an axis of the electromagnet perpendicular to the rotation axis of the mounting member and substantially parallel to the orientation of magnetic poles of the magnet; the magnet located at one end of the axis of the electromagnet;

the mounting member shaped as a barrel, and the mounting member having a mounting chamber formed therein for mounting the camera lens; the mounting member having a protruding portion disposed on an exterior wall thereof and the magnet disposed on the protruding portion;

wherein the supporting member has a positioning structure disposed thereon for fixing relative positions of the supporting member and the mounting member;

the positioning structure is an elastic sheet, and the elastic sheet is disposed away from the rotation axis of the mounting member as compared to the electromagnet; one end of the elastic sheet is fastened to the supporting member and the other end has a bump disposed thereon; the mounting member has a slot disposed thereon and the bump is abutted on the slot.

8. The terminal according to claim 7, wherein the terminal further comprises a system board, the system board is electrically connected to the electromagnet for controlling an orientation of magnetic poles of the electromagnet such that the electromagnet and the magnet attract or repel each other, and thus the mounting member is driven to rotate.

9. The terminal according to claim 7, wherein a number of the electromagnets is two, and the two electromagnets are respectively disposed at two sides of the rotation axis of the mounting member; both of the electromagnets are electrically connected to a controller; a number of the magnets is two, and the two magnets are respectively disposed corresponding to the two electromagnets;

when one electromagnet and a magnet corresponding thereto attract each other, the other electromagnet and a magnet corresponding thereto repel each other.

10. The terminal according to claim 7, wherein the supporting member is of a ring shape and the mounting member is mounted on the supporting member.

11. The terminal according to claim 7, wherein the supporting member has a positioning structure disposed thereon for fixing relative positions of the supporting member and the mounting member.

12. The terminal according to claim 7, wherein the mounting member has an elastic metal piece disposed thereon for connecting to the camera lens; the mounting member also has a flexible circuit board disposed thereon, and one end of the flexible circuit board is electrically connected to the elastic metal piece.

13. The terminal according to claim 12, wherein the supporting member has an electrical connector disposed thereon for connecting to a system board of a terminal, and both of the flexible circuit board and the electromagnet are electrically connected to the electrical connector.

14. A camera device, comprising: a mounting member for mounting a camera lens, and a supporting member;

the mounting member pivotably connected to the supporting member, and a rotation axis of the mounting member perpendicular to an axial direction of the camera lens; the mounting member having a magnet disposed thereon, the magnet located at a side of the rotation axis of the mounting member, and an orientation of magnetic poles of the magnet parallel to the axial direction of the camera lens;

the supporting member having an electromagnet disposed thereon, and an axis of the electromagnet perpendicular to the rotation axis of the mounting member; the magnet located at one end of the axis of the electromagnet;

the mounting member shaped as a barrel, and the mounting member having a mounting chamber formed therein for mounting the camera lens; the mounting member having a protruding portion disposed on an exterior wall thereof and the magnet disposed on the protruding portion;

the supporting member further has a positioning structure disposed thereon for fixing relative positions of the supporting member and the mounting member;

the positioning structure is an elastic sheet, and the elastic sheet is disposed away from the rotation axis of the mounting member as compared to the electromagnet; one end of the elastic sheet is fastened to the supporting member and the other end has a bump disposed thereon; the mounting member has a slot disposed thereon and the bump is abutted on the slot.

15. The camera device according to claim 14, wherein a number of the electromagnets is two, and the two electromagnets are respectively disposed at two sides of the rotation axis of the mounting member; both of the electromagnets are electrically connected to a controller; a number of the magnets is two, and the two magnets are respectively disposed corresponding to the two electromagnets;

when one electromagnet and a magnet corresponding thereto attract each other, the other electromagnet and a magnet corresponding thereto repel each other.

16. The camera device according to claim 14, wherein the supporting member is of a ring shape and the mounting member is mounted on the supporting member.

17. The camera device according to claim 14, wherein the mounting member has an elastic metal piece disposed thereon for connecting to the camera lens; the mounting member also has a flexible circuit board disposed thereon, and one end of the flexible circuit board is electrically connected to the elastic metal piece.

18. The camera device according to claim 17, wherein the supporting member has an electrical connector disposed thereon for connecting to a system board of a terminal, and both of the flexible circuit board and the electromagnet are electrically connected to the electrical connector.

* * * * *